United States Patent
Beacham et al.

(10) Patent No.: US 7,400,832 B2
(45) Date of Patent: Jul. 15, 2008

(54) RESILIENT SWITCH

(75) Inventors: Keith Beacham, Los Angeles, CA (US);
David Wake, Los Angeles, CA (US)

(73) Assignee: NextG Networks, Inc., San Jose, CA (US)

( * ) Notice: Subject to any disclaimer, the term of this patent is extended or adjusted under 35 U.S.C. 154(b) by 0 days.

(21) Appl. No.: 10/956,261

(22) Filed: Sep. 30, 2004

(65) Prior Publication Data

US 2006/0093354 A1 May 4, 2006

(51) Int. Cl.
*H04J 14/00* (2006.01)
(52) U.S. Cl. .............................. 398/45; 398/49; 398/50
(58) Field of Classification Search .................. 398/45, 398/46, 49, 50
See application file for complete search history.

(56) References Cited

U.S. PATENT DOCUMENTS

| | | | |
|---|---|---|---|
| 5,682,256 A | 10/1997 | Motley et al. | |
| 6,307,653 B1 * | 10/2001 | Bala et al. | 398/2 |
| 6,449,073 B1 * | 9/2002 | Huber | 398/82 |
| 6,643,423 B2 * | 11/2003 | Gruber et al. | 385/16 |
| 6,690,848 B2 * | 2/2004 | Graves et al. | 385/16 |
| 6,693,904 B1 * | 2/2004 | McKenzie et al. | 370/387 |
| 6,728,484 B1 * | 4/2004 | Ghani | 398/42 |

OTHER PUBLICATIONS

"Radio over fibre networks for mobile communications," by David Wake et al., *Proc. SPIE*, vol. 5466, 2004 (12 pages).

* cited by examiner

*Primary Examiner*—Dzung D Tran
(74) *Attorney, Agent, or Firm*—Vierra Magen Marcus & DeNiro LLP

(57) ABSTRACT

A switch for the switching of communications system signals, with m input ports and n output ports, comprising two or more parallel switch matrices, each of size m×n, combined so that each switch matrix contributes to the available output power at each output port. The failure of one of the switch matrices, or one of the transmission paths therein, will therefore result only in a small reduction in the output power at the relevant output port, rather than complete power loss as would be the case for a conventional switch This fault condition can be detected using a power imbalance detection circuit in the switch matrix combiner. Additionally, the fault condition, having been detected by the power imbalance detection circuit, may be temporarily compensated by an automatic level control system.

23 Claims, 4 Drawing Sheets

RESILIENT SWITCH

BACKGROUND OF THE INVENTION

The present invention relates to a resilient switch and, more particularly, to a resilient switch for communications systems, wireless communications systems using distributed antennas, and to cellular and radio distribution points.

The use of a switch matrix for wireless communications systems based on distributed antennas is disclosed by Motley et al. in U.S. Pat. No. 5,682,256. Motley uses a switch matrix to interconnect a number of base stations on the input ports to a number of distributed antennas on the output ports. The switch matrix allows any combination of inputs to be connected to any combination of outputs so that base stations can be connected to antennas in a very flexible manner. This allows wireless services such as cellular radio to be delivered to users with significant cost savings for network operators. The benefits of using a switched distributed antenna system are outlined for example in a recent paper by Wake and Beacham, Proc. SPIE vol. 5466, 2004.

FIG. 1 shows a switch matrix having an exemplary size of 8×4. The switch matrix comprises of 8 input ports 1 and 4 output ports 2. Each input port is connected to a 1:4 power splitter 3 and each output port is connected to an 8:1 power combiner 4. For each splitter 3, its four outputs are connected to the inputs of the four combiners 4 as shown in FIG. 1 so as to ensure that any input to the switch matrix can be available at any output of the switch matrix. Each connection 5 between a given splitter and a given combiner comprises a single pole single throw switch element 6 and a variable attenuator 7 in series. FIG. 1 schematically illustrates only one switch element 6 and one variable attenuator, but there are 32 switch elements and 32 variable attenuators in total for this size of matrix. The switches can be set to either an "on" state or an "off" state so that any combination of input signals can be routed to any combination of output ports. The variable attenuators can be set to balance the path loss across all paths between input and output.

The switch matrix of FIG. 1 is a single point of failure for a system such as described in Motley et al. If the switch matrix fails, there would be a loss of service between the network operators at one end of the switch matrix and users at the other end. Even if only a single connection 5 in the switch matrix fails, there will be a loss of service.

BRIEF SUMMARY OF THE INVENTION

The present invention provides an apparatus and method that ensures that a single component failure in a switch matrix for a communications system does not lead to a loss in service. For the case of an m×n switch, this is accomplished by using two or more separate m×n switch matrices in parallel, with m 1:y splitters on the input ports and n y:1 combiners on the output ports, where y is the number of switch matrices. The switch matrices are combined so that each contributes to the available output power at each output port. The failure of one of the switch matrices, or one of the transmission paths therein, will therefore result in a small reduction in the output power at the relevant output port, rather than total transmission loss as would be the case for a conventional switch.

If the probability of a failure in a single switch matrix is $p_b$, then the probability of a failure for a combined switch, $p_f$, as constructed according to the present invention is:

$$p_f = p_b^y \qquad \text{(Equation 1)}$$

Probability of failure is therefore dependent exponentially on the number y of matrices. The use of two parallel switch matrices is likely to provide sufficient resilience for most applications, although the present application is not limited to two switch matrices in parallel.

Furthermore, the present invention provides a means for detecting a fault condition. A fault condition can be detected using a power imbalance detection circuit in the switch matrix combiner. Such a circuit could be constructed using comparators for example. The detection circuit can further be connected to an alarm to indicate the detection of a fault condition. The alarm can indicate which switch matrix, and further which individual switch path through the matrix, has failed.

Additionally, the fault condition may be temporarily compensated by an automatic level control system. As noted above, the system is able to detect which switch matrix, and further which individual switch path through that matrix, has failed and provide a corresponding alarm. Each switch path through a switch matrix incorporates variable gain control, either by using amplifiers or attenuators (or both) with remotely adjustable gain or loss. An automatic level control system may be implemented which increases the gain in the equivalent switch paths in the fully-operational switch matrix or matrices to compensate for the signal loss in the failed switch matrix. This system will provide temporary cure until the switch matrix is repaired.

The present invention therefore includes three separate aspects. First, resilience is afforded by having multiple switch matrices in parallel so that a failure in one does not result in total signal loss at the outputs of the combined switch. Second, a detection circuit can identify which switch matrix has failed and further which path in the matrix has failed. An alarm system can be used to indicate the failure. Third, cure is provided through an automatic level control system that is able to compensate for the loss in output power by increasing the gain in the equivalent paths in the fully-operational switch matrix or matrices.

The present invention further includes a method for providing resilience and a method of using a resilient switch.

These and other features and advantages of embodiments of the present invention will be apparent to those skilled in the art from the following detailed description of the embodiments of the invention, when read with the drawings and the appended claims.

DETAILED DESCRIPTION OF THE INVENTION

In the following description of embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

Figure 2:
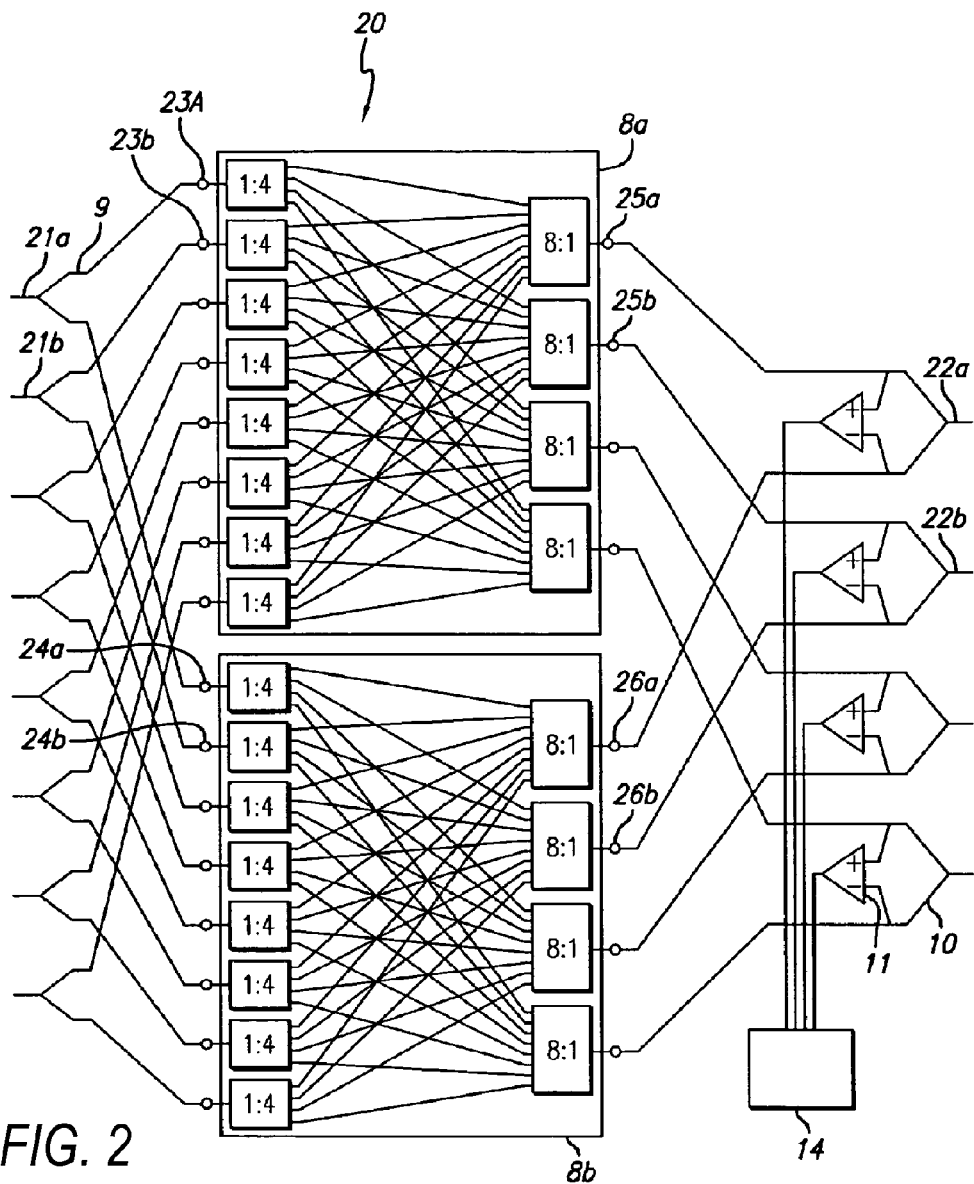
FIGS. 2 and 2a are illustrations of embodiments of the present invention.

FIG. 2 shows an embodiment of a resilient switch for routing signals with an 8×4 matrix size, for the case where the number of switch matrices (y) is 2. The resilient switch 20 of FIG. 2 has a number of input ports or nodes 21a, 21b, . . . and output ports or nodes 22a 22b, . . . . The input ports or nodes 21a, 21b, . . . of the resilient switch 20 can be connected to base stations and the output ports or nodes 22a, 22b, . . . of the resilient switch 20 can be connected to distributed antennas to form a communications system.

Figure 1:
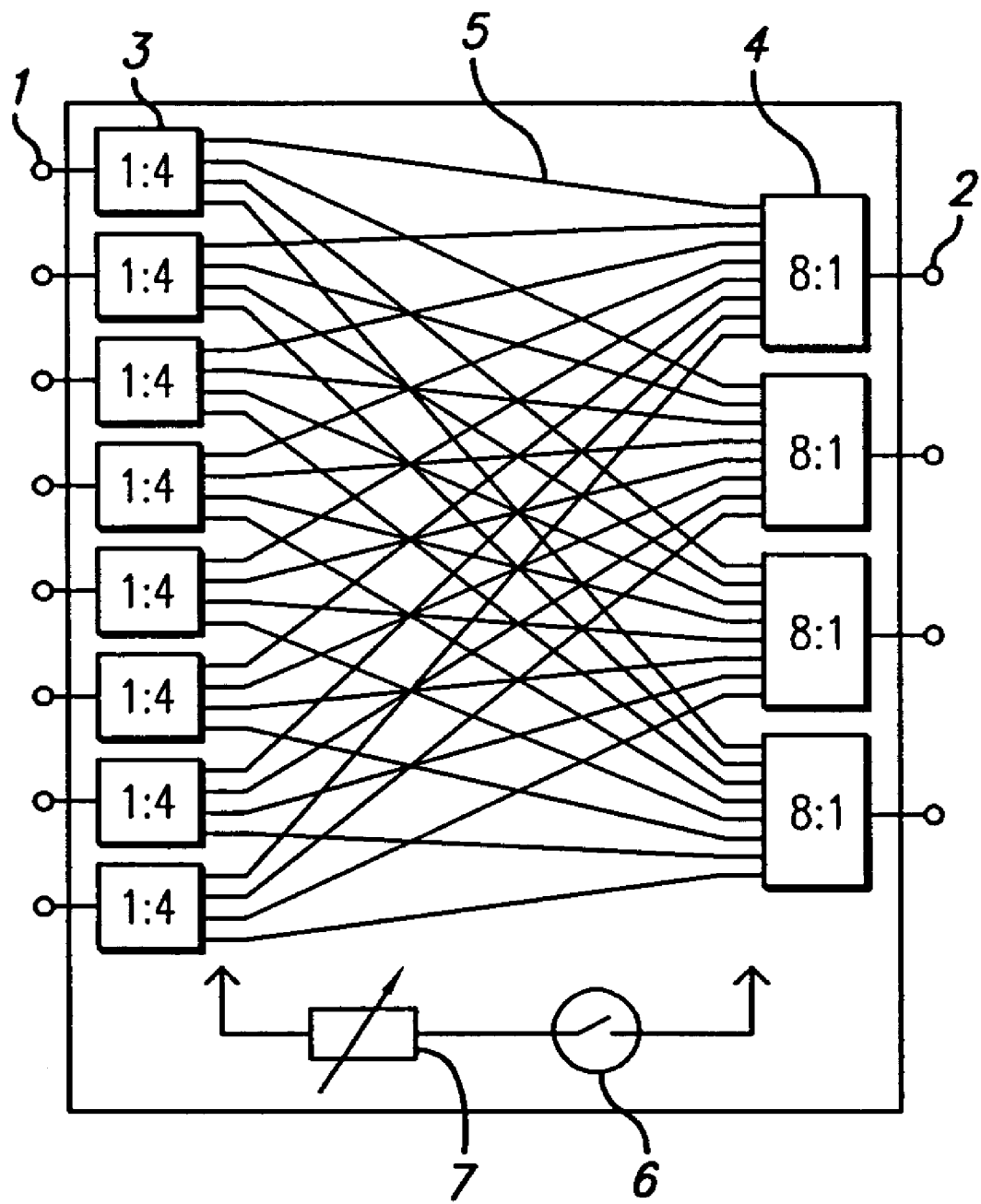
FIG. 1 is an illustration of an 8×4 switch matrix.

The resilient switch 20 comprises 2 switch matrices 8a and 8b in parallel. Although FIG. 2 illustrates each switch matrix 8a and 8b as 8×4, any size matrix can be used. Switch matrix 8a has eight input ports 23a, 23b, . . . and four output ports 25a, 25b, . . . and, similarly, switch matrix 8b has eight input ports 24a, 24b, . . . and four input ports 26a, 26b . . . . Furthermore, each switch matrix 8a and 8b has splitters, combiners, switch elements and variable attenuators as illustrated in the switch matrix of FIG. 1 and, thus, are not referenced or re-illustrated in FIG. 2. The input ports or nodes 21a, 21b . . . of the resilient switch 20 are connected to the input ports 23a, 23b, . . . of switch matrix 8a and the input ports 24a, 24b . . . . of switch matrix 8b by means of 8×1:2 splitters 9 as illustrated in FIG. 2. Likewise, the output ports 25a, 25b . . . . of switch matrix 8a and the output ports 26a, 26b, . . . of switch matrix 8b are connected to the output ports or nodes 22a, 22b, . . . of the resilient switch 20 by means of 4×2:1 combiners 10 as illustrated in FIG. 2.

The arrangement in FIG. 2 allows the input signals to reach distributed output ports or nodes through either or both of the switch matrices. This is further illustrated in FIG. 3. An input signal at input port or node 21a of the resilient switch 20 can be routed to output port or node 22a in the following manner. The signal is split between the two matrices 8a and 8b of the resilient switch 20. The signal travels through path 16 of the first switch matrix 8a and path 17 of the second switch matrix 8b and then is combined prior to output port or node 22a. A failure in one of the switch matrices or one of the transmission paths therein would not result in a loss of service. For example, if path 16 fails as denoted by the broken line, path 17 is still able to make the connection between the input port or node 21a and the output port or node 22a as indicated by the bold line. The connection is made with a reduction of the output power at the output port or node 22a, but not total or complete power loss as would be the case with a conventional switch. Although in this example only a single signal was used, the present invention can provide resilience for a plurality of signals.

With reference once again to FIG. 2, each combiner 10 contains a power imbalance detection circuit so that any imbalance between the equivalent outputs from the switch matrices can be detected. Such an imbalance would result, for example, from a switch element failure in one of the switch matrices or a complete failure of a switch matrix. In one embodiment, the power imbalance detection circuits are comparators 11. The comparator outputs can be used to set an alarm in the alarm system 14 to indicate that a given switch matrix needs to be repaired. The alarm can further indicate which switch path in the switch matrix needs to be repaired.

A comparator gives a digital output that depends on the difference in analog voltage on its two inputs. Initially, the input voltages are the same. If one of the input voltages changes beyond a pre-set level then the comparator output will switch from zero output to a high output or a low output, depending on the polarity of the input voltage change. The output of the comparator therefore provides sufficient information for the alarm system to know which switch matrix has failed. Although the present embodiment utilizes a comparator as a detection circuit, other detection circuits can be used.

An automatic level control (ALC) system may be implemented in order to temporarily compensate for this power reduction before the switch matrix is repaired. For example, the alarm system could be used to effect a reduction of the attenuation of the variable attenuator in the relevant signal path in the fully-working switch matrix. Full power would therefore be restored at the appropriate output port of the resilient switch. For the case where there is a total failure of one of the switch matrices, caused for example by failure of its power supply, the variable attenuation in all signal paths of the fully-working switch matrix would be reduced in order to restore full power at each of the output ports of the resilient switch.

Figure 3:
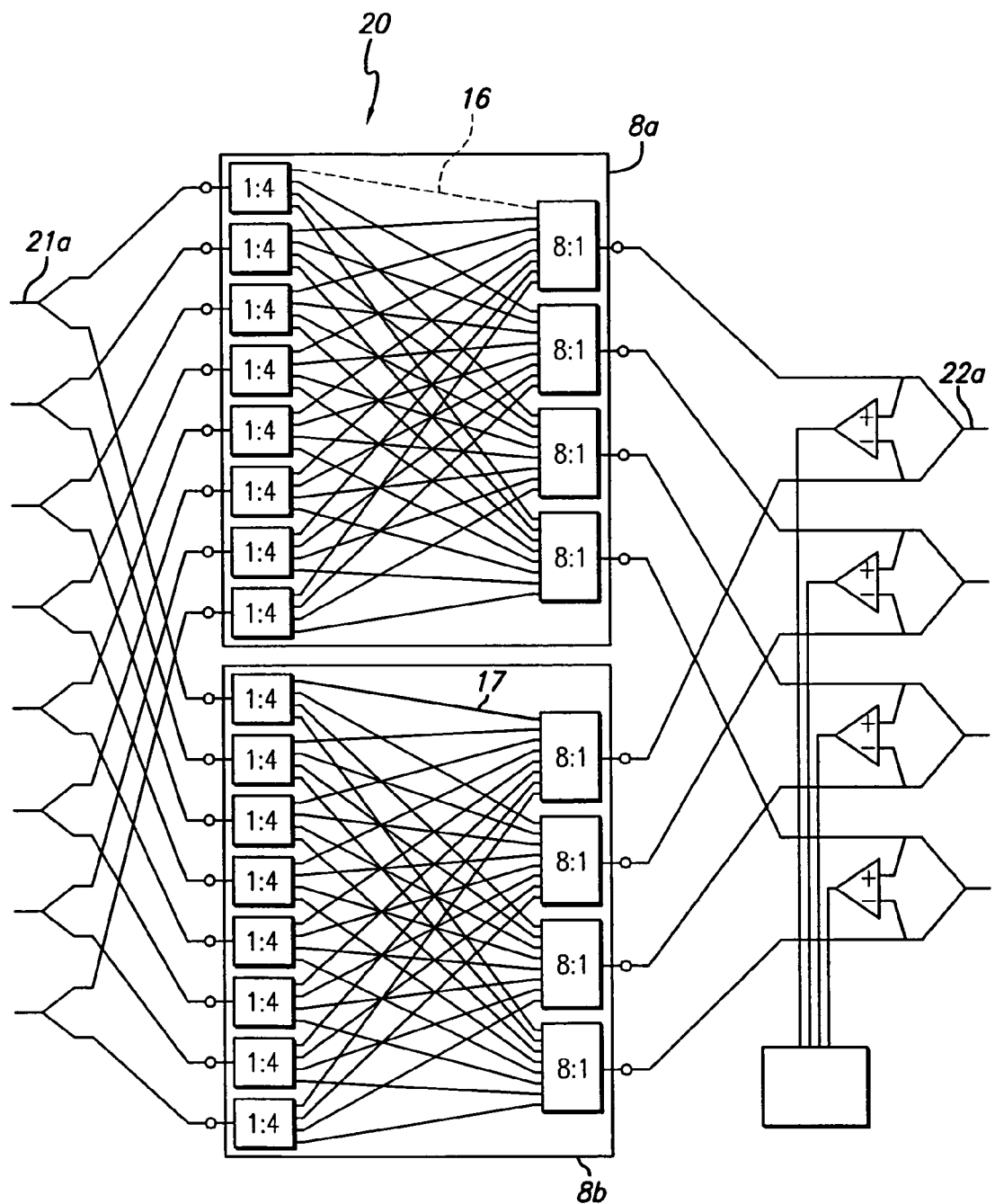
FIG. 3 is an illustration of the embodiment in FIG. 2 providing resilience in a fault condition.
Figure 4:
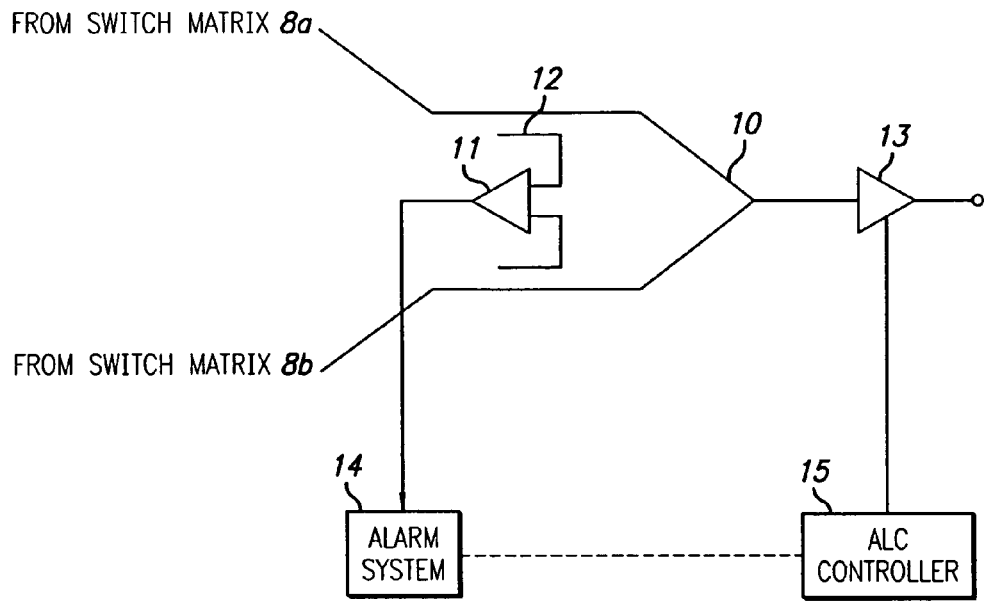
FIG. 4 is a schematic illustration of one embodiment of an automatic level control system of the present invention.

ALC may also be implemented using variable gain amplifiers in the external combiner network. FIG. 4 shows one embodiment. The combiner inputs from the two switch matrices, such as matrices 8a and 8b in FIGS. 2 and 3, are noted in FIG. 4. A small amount of power is tapped from each arm of the combiner 10 using directional couplers 12, for example, and this power is fed to the inputs of a comparator 11. The signals are combined using the combiner 10 and then fed into a variable gain amplifier 13. The control signal from the comparator 11 is fed into an alarm system 14, the output of which is used, via an ALC controller 15 to set the gain of the variable gain amplifier. An imbalance of power in the arms of the combiner 10 is thereby detected by the comparator and this is used to set an alarm system. The output of the alarm system is connected to the ALC controller which then provides a control signal to the variable gain amplifier to increase its gain to restore full power. It should be noted that the alarm system can be any device that indicates a failure.

In summary, for any failure mode that results in the partial or total failure of one of the switch matrices: (1) the failure does not result in total power loss (the maximum power loss is only 3 dB for two parallel switch matrices) at any of the output ports of the resilient switch, (2) the failure can be detected and, furthermore, an alarm can be utilized so that the faulty switch matrix can be repaired at a later date, and (3) automatic level control systems may be implemented so that full power can be temporarily restored to the relevant output ports of the resilient switch until repair.

Figure 2A:
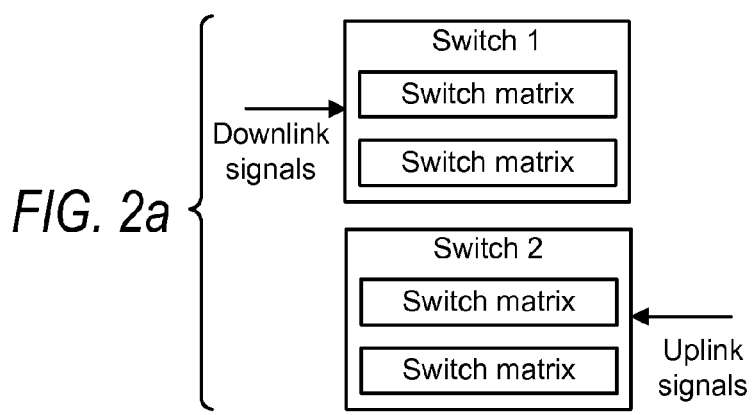

Further embodiments may require multiple resilient switches to be used and, further, with a common alarm and control system. For example, a resilient switch may be used for a forward transmission path and another resilient switch may be used for a reverse transmission path or multiple resilient switches may be used for diversity paths in a wireless communications system. Having separate forward and reverse transmission directions through multiple resilient switches is an approach that may be used where crosstalk and distortion would cause unacceptable performance degradation if a single resilient switch is used. See, e.g., FIG. 2a, which provides a communication system which includes a first switch which routes downlink signals, and a second switch which routes uplink signals. Each switch includes at least two switch matrices.

Another example of a situation where multiple resilient switches may be used is where several types of communications systems are switched independently but managed using a common control system. Each communication system could operate under a different frequency band.

A principle of the invention described herein is the use of multiple switch paths combined to provide a single output, thereby ensuring resilience to failure in a single path. This principle is not limited to a resilient switch having two or more matrices in parallel. Any number of matrices can be used. In a further embodiment, the multiple switch paths may also be provided by interleaving together paths in one or more common switch matrices. This can also provide closer system integration and allow operational and functional benefits.

Figure 5:
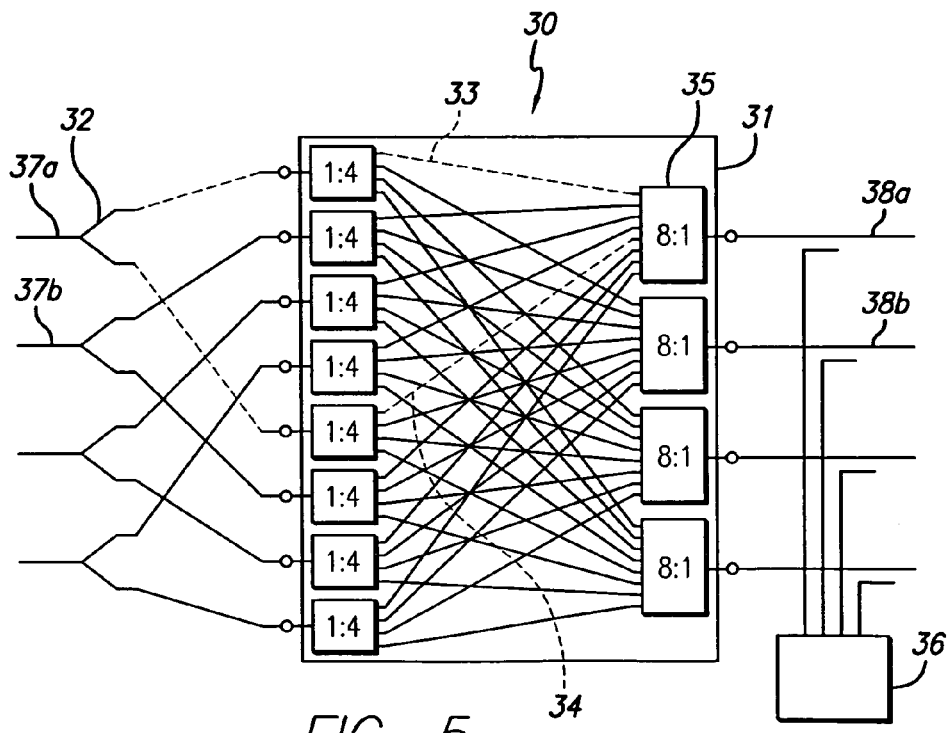
FIG. 5 is an illustration of another embodiment of the present invention.

FIG. 5 illustrates one embodiment in which a single matrix is used as a resilient switch. The resilient switch 30 comprises a switch matrix 31. The switch matrix 31 has the splitters, combiners, switch elements and variable attenuators as illustrated in the switch matrix of FIG. 1 and, thus, are not referenced or re-illustrated in FIG. 5. The input ports or nodes 37a, 37b . . . of the resilient switch 30 can be connected to base stations and the output ports or nodes 38a, 38b, . . . of the resilient switch 30 can be connected to distributed antennas to form a communications system.

The resilient switch 30 of FIG. 5 can operate in the following manner. A signal at input port or node 37a is split by splitter 32 into two input ports of the switch matrix 31 as illustrated in FIG. 5. The signal travels through two paths 33 and 34 within switch matrix 31. The signals are combined by a combiner 35 in the switch matrix 31 to be output at output port or node 38a. An alarm system 36 monitors the composite power at the output port. If a path in the switch matrix 31 fails, such as path 33, path 34 is still able to make the connection between the input port or node 37a and the output port or node 38a. Thus, a break in one path will not result in a total power loss. The alarm system 36 detects the drop in composite power for future repair. A temporary cure such as discussed above in FIG. 4 can further be used.

While the switching core of the resilient switch will usually be analog in nature, this present invention is not so limited. The present invention also covers other types of core switching (such as digital or time switching) as long as the outputs can be combined to provide resilience.

While the present invention has been described in the context of an apparatus, the present invention also includes a method for providing resilience. The method for providing resilience comprises receiving a signal. The signal can be of any of the types described above, such as signals used in wireless communications systems. The method can further include splitting the signal into separate signals. The signal can be split by any means described above, such as a splitter. The method can further include transmitting the two signals to two input ports. The input ports can be at separate switch matrices such as in FIG. 2 or can be two different input ports of the same switch matrix such as in FIG. 5. The method can further include transmitting the two signals in separate transmission paths. The method can further include combining the signals from the separate transmission paths prior to an output port or node. The signal can be combined by any means described above, such as a combiner.

The method can further include detecting a loss of power in one of the transmission paths. Detection can be by any means described above, such as the detection circuit of FIG. 2. The method can further include curing the loss of power in one of the transmission paths. Curing can be by an means described above, such as the means described in FIG. 4.

The present invention also includes a method of using a resilient switch, such as one of the resilient switches discussed above.

Although the present invention has been fully described in connection with the embodiments thereof and with reference to the accompanying drawings, it is to be noted that various changes and modifications will become apparent to those skilled in the art. Such changes and modifications are to be understood as being included within the scope of the present invention as defined by the claims.

What is claimed is:

1. A switch for a communications system for routing a signal from a first node to a second node, the switch comprising:
   a plurality y of m×n switch matrices in parallel, including at least first and second switch matrices, each switch matrix having a plurality of associated input ports and associated output ports connected by switch paths, the signal is routed from the first node to the second node via each switch matrix;
   m 1:y splitters, one of the splitters connecting the first node to one of the associated input ports of each switch matrix, the one of the splitters splitting the signal, which is received by the one of the splitters via the first node, so that the signal at a first output of the one of the splitters is routed to the associated input port of the first switch matrix via a first signal path which extends between the first output and the associated input port of the first switch matrix, and the signal at a second output of the one of the splitters is routed to the associated input port of the second switch matrix via a second signal path which extends between the second output and the associated input port of the second switch matrix, the first and second signal paths do not include attenuation or switched devices; and
   n y:1 combiners, one of the combiners connected to an associated output port of each switch matrix, at an input side of the one of the combiners, and to the second node, at an output side of the one of the combiners, each switch matrix output port contributing to a power of the second node such that a failure in one of the switch matrices does not result in a total loss of power at the second node, the one of the combiners includes first and second inputs and receives and combines: a) the signal at the first output of the one of the splitters from the associated output port of the first switch matrix via a third signal path which extends between the first input and the associated output port of the first switch matrix, and b) the signal at the second output of the one of the splitters from the associated output port of the second switch matrix via a fourth signal path which extends between the second input and the associated output port of the second switch matrix, the third and fourth signal paths do not include attenuation or switched devices, and the signals which are combined by the one of the combiners have the same voltage when there is no failure in the switch matrices.

2. The switch as in claim 1 wherein each of the combiners comprises a detection circuit for detecting the failure.

3. The switch as in claim 2 wherein the detection circuit detects a faulty switch path in one of the switch matrices.

4. The switch as in claim 2 wherein the detection circuit comprises a comparator which provides an output that depends on a difference in analog voltages on its inputs.

5. The switch as in claim 2 further comprising an alarm, wherein the detection circuit outputs a signal to trigger the alarm.

6. The switch as in claim 5 further comprising a control system, said control system generating at least one control signal in response to an output from the alarm, wherein the control signal sets a gain in a switch path in each switch matrix that is not faulty so that the power at the second node is maintained.

7. The switch as in claim 6 wherein the gain in each switch path is set using at least one variable gain amplifier.

8. The switch as in claim 6 wherein the gain in each switch path is set using at least one attenuator.

9. The switch as in claim 8 wherein the attenuator is external to each of the switch matrices.

10. The switch as in claim 5, further comprising a variable gain amplifier within each of the switch matrices, one of the variable gain amplifiers which is in one of the switch matrices which is not faulty reduces an attenuation of a switch path portion responsive to the alarm being triggered, the switch path portion is between the associated input port of the first switch matrix and the associated output port of the first switch matrix, when the failure is in the second switch matrix and the first switch matrix is not faulty.

11. The switch as in claim 5, further comprising a variable gain amplifier at the output side of the one of the combiners, for adjusting a gain at the output side of the one of the combiners responsive to the alarm being triggered.

12. The switch as in claim 5, further comprising an attenuator within each of the switch matrices, one of the attenuators which is in one of the switch matrices which is not faulty reduces an attenuation of a switch path portion responsive to the alarm being triggered, the switch path portion is between the associated input port of the first switch matrix and the associated output port of the first switch matrix, when the failure is in the second switch matrix and the first switch matrix is not faulty.

13. The switch as in claim 1 wherein the signal is switched in the plurality of switch matrices using time switching.

14. The switch as in claim 1, wherein:
for each switch matrix, the associated input port to which the first node is connected, is connected to the associated output port to which the one of the combiners is connected.

15. The switch as in claim 1, wherein:
each switch matrix includes m input ports and n output ports, where m does not equal n.

16. The switch as in claim 1, wherein:
for each switch matrix, each of the plurality of associated input ports is connected to a 1:n power splitter for the switch matrix, and each of the plurality of output ports is connect to an m:1 power combiner for the switch matrix.

17. A communications system for routing signals, said system comprising:
a first switch having at least two switch matrices in parallel to provide a plurality of switch paths to each of a plurality of output ports of the first switch, each of the switch matrices of the first switch connecting an associated input port to an associated output port, the first switch including a first switch matrix which connects a first input port to a first output port, and a second switch matrix which connects a second input port to a second output port;
a first splitter which splits a first signal so that the first signal at a first output of the first splitter is routed to the first output port via the first input port and the first switch matrix, and the first signal at a second output of the first splitter is routed to the second output port via the second input port and the second switch matrix;
a first combiner connected to the associated output ports of each of the switch matrices of the first switch, including the first and second output ports, for receiving and combining: (a) the first signal at the first output of the first splitter via the first output port and (b) the first signal at the second output of the first splitter via the second output port;
a second switch comprising at least two switch matrices in parallel to provide a plurality of switch paths to each of a plurality of output ports of the second switch, each of the switch matrices of the second switch connecting an associated input port to an associated output port, the second switch including a third switch matrix which connects a third input port to a third output port, and a fourth switch matrix which connects a fourth input port to a fourth output port;
a second splitter which splits a second signal so that the second signal at a first output of the second splitter is routed to the third output port via the third input port and the third switch matrix, and the second signal at a second output of the second splitter is routed to the fourth output port via the fourth input port and the fourth switch matrix;
a second combiner connected to the associated output ports of each of the switch matrices of the second switch, including the third and fourth output ports, for receiving and combining:
(a) the second signal at the first output of the second splitter via the third output port and (b) the second signal at the second output of the second splitter via the fourth output port; and
a controller for controlling the first and second switches to route downlink and uplink signals, wherein the first switch routes the downlink signals and the second switch routes the unlink signals.

18. The communications system of claim 17 wherein the first switch routes signals of a first frequency band and the second switch routes signals of a second frequency band.

19. The communications system of claim 17 further comprising an alarm for detecting a faulty switch path in the first or second switch.

20. The communications system of claim 17, wherein the first signals which are combined by the first combiner have the same voltage when there is no failure in the at least two switch matrices of the first switch, and the second signals which are combined by the second combiner have the same voltage when there is no failure in the at least two switch matrices of the second switch.

21. A switch for a communications system for routing a signal from a first node to a second node, the switch comprising:
a plurality y of m×n switch matrices in parallel, including at least first and second switch matrices, each switch matrix having a plurality of associated input ports and associated output ports connected by switch paths, the signal is routed from the first node to the second node via each switch matrix;
m 1:y splitters, one of the splitters connecting the first node to one of the associated input ports of each switch matrix, the one of the splitters splitting the signal, which is received by the one of the splitters via the first node, so that the signal at a first output of the one of the splitters is routed to the associated input port of the first switch matrix via a first signal path which extends between the first output and the associated input port of the first switch matrix, and the signal at a second output of the one of the splitters is routed to the associated input port of the second switch matrix via a second signal path which extends between the second output and the associated input port of the second switch matrix, the first and second signal paths do not include attenuation or switched devices;
n y:1 combiners, one of the combiners connected to an associated output port of each switch matrix, at an input side of the one of the combiners, and to the second node, at an output side of the one of the combiners, the one of the combiners includes first and second inputs and receives and combines: a) the signal at the first output of the one of the splitters from the associated output port of the first switch matrix via a third signal path which extends between the first input and the associated output port of the first switch matrix, and b) the signal at the second output of the one of the splitters from the associated output port of the second switch matrix via a fourth signal path which extends between the second input and the associated output port of the second switch matrix, the third and fourth signal paths do not include attenuation or switched devices.

22. The switch as in claim 21, further comprising:
a variable gain amplifier provided at the output side of the one of the combiners for adjusting a gain at the output side of the one of the combiners responsive to an alarm indicating that there is a failure in one of the switch matrices.

23. The switch as in claim 21, wherein:
the signals at the first and second outputs have the same voltage when there is no failure in the switch matrices.

* * * * *